United States Patent
Lacroute et al.

(10) Patent No.: US 7,397,794 B1
(45) Date of Patent: Jul. 8, 2008

(54) SYSTEMS AND METHODS FOR IMPLEMENTING VIRTUAL SWITCH PLANES IN A PHYSICAL SWITCH FABRIC

(75) Inventors: Philippe Lacroute, Sunnyvale, CA (US); Matthew A. Tucker, San Francisco, CA (US); John D. Weisbloom, San Jose, CA (US); Anjan Venkatramani, Mountain View, CA (US); Jayabharat Boddu, Santa Clara, CA (US); Stefan Dyckerhoff, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1048 days.

(21) Appl. No.: 10/300,639

(22) Filed: Nov. 21, 2002

(51) Int. Cl.
*H04L 12/50* (2006.01)

(52) U.S. Cl. ..................... 370/367; 370/388

(58) Field of Classification Search ............... 370/356, 370/367, 387, 388, 392
See application file for complete search history.

(56) References Cited

U.S. PATENT DOCUMENTS

| | | | | |
|---|---|---|---|---|
| 5,369,400 A | * | 11/1994 | Bowdon | 340/2.22 |
| 5,459,724 A | * | 10/1995 | Jeffrey et al. | 370/398 |
| 5,982,770 A | * | 11/1999 | Sekine | 370/360 |
| 6,335,930 B1 | * | 1/2002 | Lee | 370/387 |
| 6,973,079 B1 | * | 12/2005 | Carlson et al. | 370/367 |
| 7,046,681 B2 | * | 5/2006 | Siu et al. | 370/400 |

\* cited by examiner

*Primary Examiner*—Hassan Kizou
*Assistant Examiner*—Bo Hui A Zhu
(74) *Attorney, Agent, or Firm*—Harrity Snyder, LLP

(57) ABSTRACT

A switching device includes multiple interfaces and a switch fabric. The switch fabric includes switch integrated circuits arranged in a number of stages. Multiple virtual switch planes may be implemented in the switch fabric. Data traffic received at the interfaces is selectively assigned to different ones of the virtual switch planes.

10 Claims, 11 Drawing Sheets

SYSTEMS AND METHODS FOR IMPLEMENTING VIRTUAL SWITCH PLANES IN A PHYSICAL SWITCH FABRIC

BACKGROUND OF THE INVENTION

1. Field of the Invention

The present invention relates generally to network devices, and more particularly, to systems and methods for implementing virtual switch planes in physical switch fabrics of network devices.

2. Description of Related Art

Conventionally, high bandwidth switch fabrics have used several parallel switch "planes" that each carry a fraction of the total bandwidth. FIG. 1 illustrates a conventional switch fabric 100 with parallel switch planes 120, 125, 130 and 135. Each switch plane may include multiple interconnected switch integrated circuits (ICs) 110-1-110-12 (collectively, 110), with each switch IC employing one of a variety of switch architectures, such as a crossbar switch.

Interface cards 105 interconnect with switch ICs 110 of each of the parallel switch planes (only interconnections to switch plane 1 are shown) and divide the received bandwidth over the n planes of the switch fabric 100 (four planes shown). Each of interface cards 105 may interconnect with a number of ports on the switch ICs 110. If switch fabric 100 must support a total bandwidth B and have P ports, then each of the parallel switch planes must also have P ports, but each switch plane only needs to support a total bandwidth of B/n, where n is the number of planes. The use of parallel switch planes thus makes it possible for switch fabric 100 to support bandwidths much larger than could be supported by a single IC switch, without introducing much complexity.

The number of ports on a single switch plane, however, determines the most cost-effective number of interface cards 105 in a given system. Supporting small system sizes (i.e., smaller than the natural number of ports in a fabric) generally requires wasting ports, or designing a new switch fabric. Thus, a conventional switch fabric 100 cannot be used with systems having a different number of interface cards 105 than the number of ports on switch fabric 100.

Therefore, there exists a need for systems and methods that can enable a given switch fabric to support systems with fewer interface cards than the number of switch ports on the switch fabric, thus, permitting the implementation of smaller scale system sizes.

SUMMARY OF THE INVENTION

Systems and methods consistent with the principles of the invention address this and other needs by implementing multiple virtual switch planes in a physical switch plane of a network device such that the switch fabric can support systems with fewer interface cards than the number of switch ports on the switch fabric. A switch fabric with P ports may, when implemented with S virtual switch planes, connect with P/S interface cards by connecting each interface card to the switch fabric S times. Consistent with the principles of the invention, address re-mapping tables may be used within switch ICs of the switch fabric to direct incoming data units through appropriate virtual switch planes to reach destination output interfaces. The use of virtual switch planes within the switch fabric can be transparent to the interface cards, localizing changes to the switch fabric itself rather than requiring the interface cards to be configured differently depending on the switch configuration.

One aspect consistent with principles of the invention is directed to a method of forwarding data units through a plurality of virtual switch planes. The method includes implementing a virtual switch plane in a physical switch plane, wherein the physical switch plane includes input ports and a switch fabric. The method further includes allocating at least one of the input ports to the virtual switch plane and forwarding data units through the at least one allocated input port to the virtual switch plane.

A second aspect consistent with principles of the invention is directed to a method of implementing multiple virtual switch planes in a physical switch plane in which the physical switch plane includes a switch fabric and queues. The method includes segmenting the physical switch plane into the multiple virtual switch planes. The method further includes segregating the queues into groups such that each group of queues is associated with a different one of the multiple virtual switch planes.

Another aspect consistent with principles of the invention is directed to a method of handling data traffic at a physical switch plane of a network device, where the physical switch plane includes virtual switch planes. The method includes receiving the data traffic and selectively assigning the received traffic to different ones of the virtual switch planes.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention include mechanisms for implementing virtual switch planes in a physical switch plane of a network device. Through the use of virtual switch planes, the physical switch plane can support systems with fewer interface cards than the number of switch ports on the switch fabric without wasting ports, thus, enabling the implementation of cost effective smaller scale system sizes.

Exemplary Network Device

Figure 1:
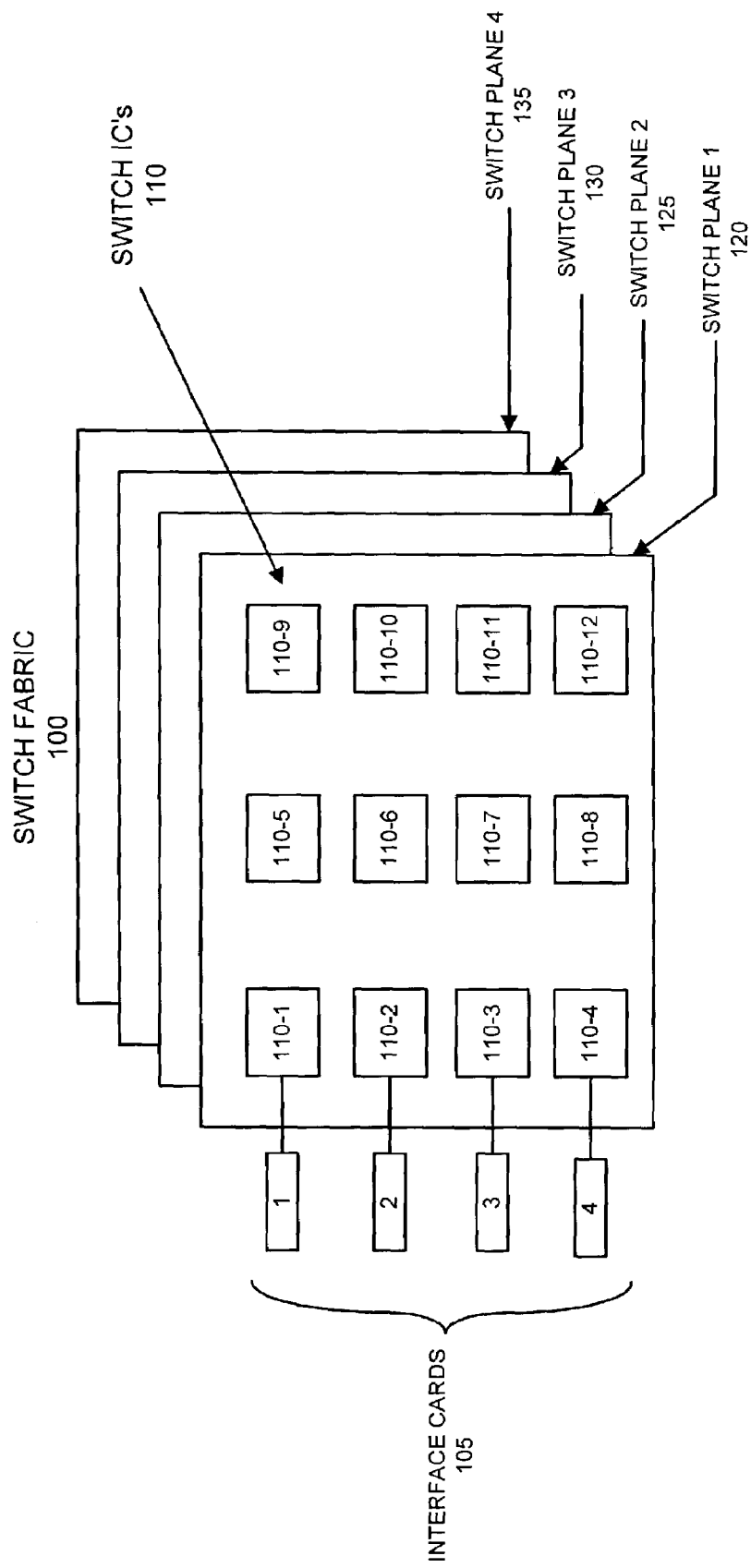
FIG. 1 is a diagram of a conventional multi-plane switch fabric.
Figure 2:
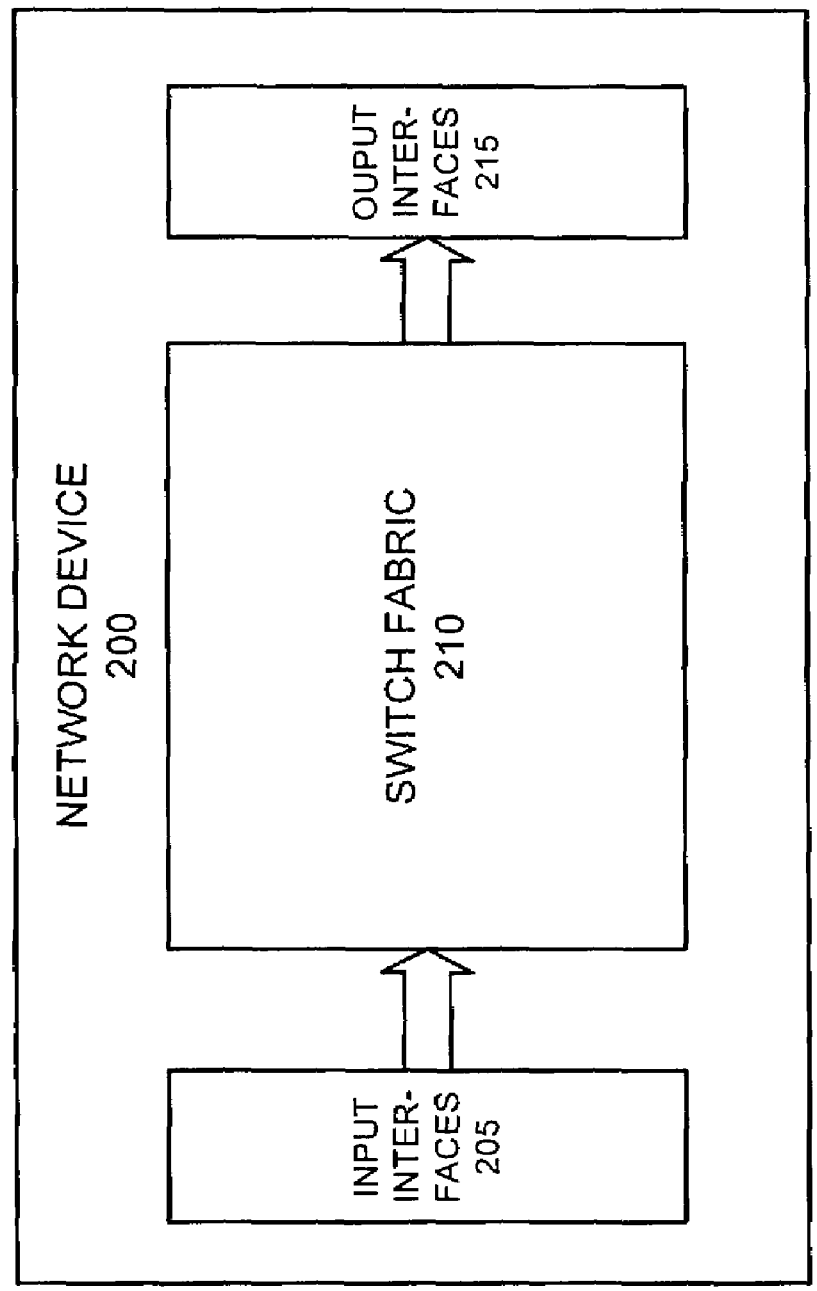
FIG. 2 is a diagram of an exemplary network device in which systems and methods consistent with the principles of the invention may be implemented.

FIG. 2 is a diagram of an exemplary network device 200 in which systems and methods consistent with the principles of the invention may be implemented. Network device 200 may receive data units, such as packets, from a physical link (not shown). Network device 200 may process the data units to determine destination information and transmit the data units on one or more links in accordance with the destination information. A data unit refers to any type of data, including, for example, packets, cells, datagrams, fragments of packets, fragments of datagrams or cells, or a combination of these types of data.

Network device 200 may include input interfaces 205, a switch fabric 210, and output interfaces 215. Input interfaces 205 may receive incoming streams of data units and send each received data unit to the switch fabric 210 for routing to an appropriate output interface of output interfaces 215. Switch fabric 210 may include multiple physical switch planes (not shown), each of which may include a network of switch ICs that route data units from input interfaces 205 to appropriate output interfaces 215.

Exemplary Switch Fabrics

Figure 3:
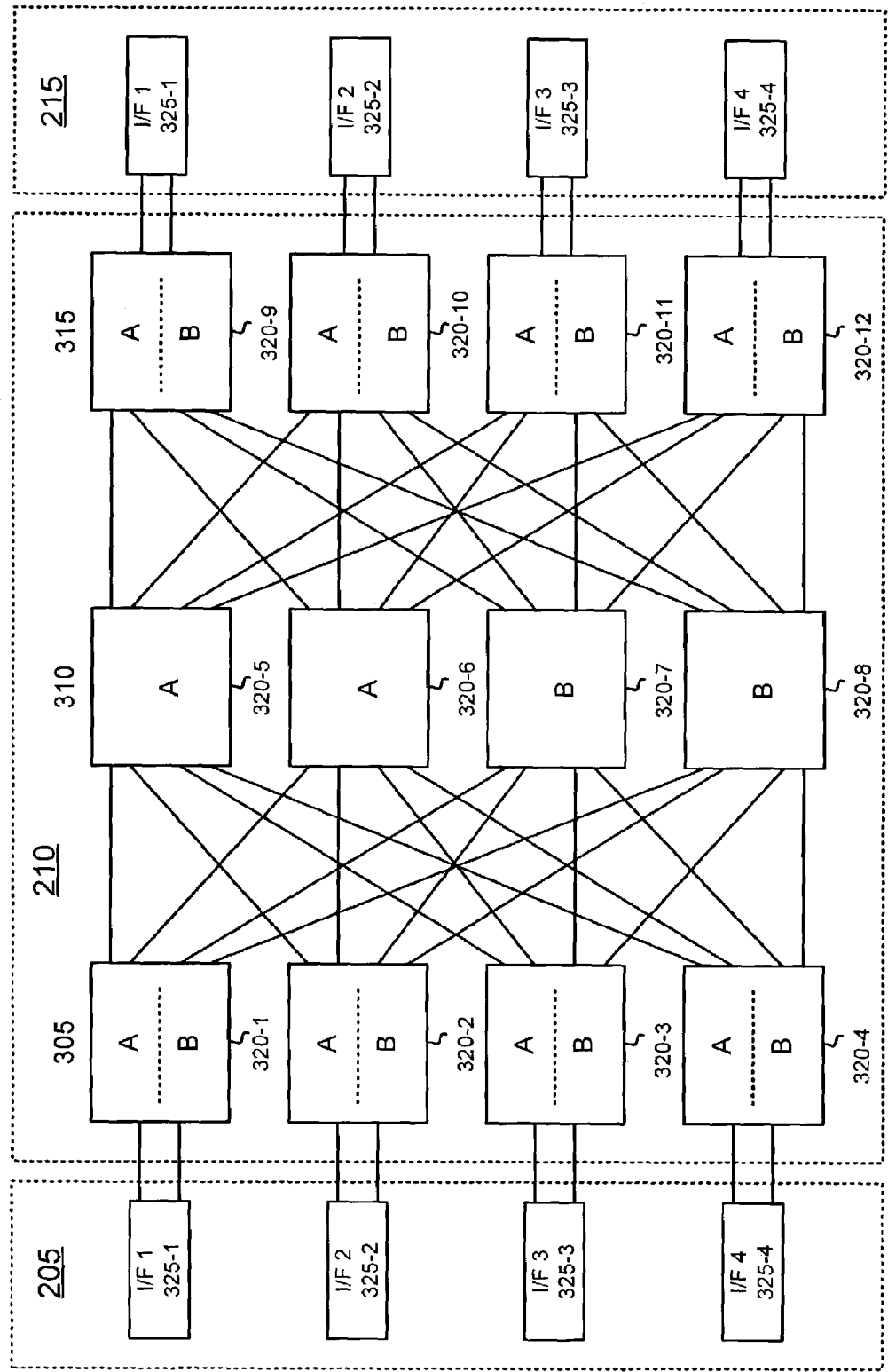
FIG. 3 is a diagram of components of a first exemplary switch plane according to an implementation consistent with the principles of the invention.
Figure 4:
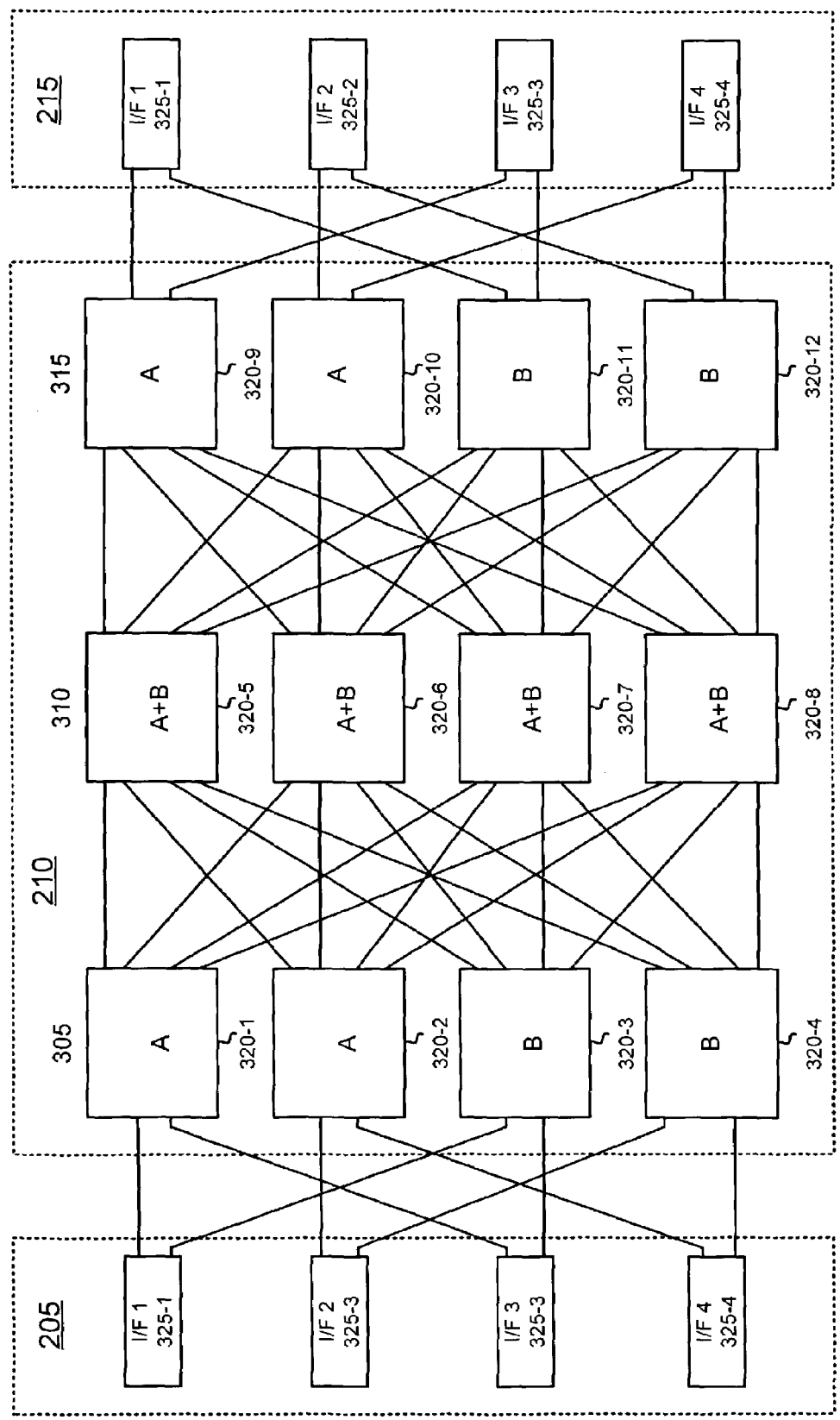
FIG. 4 is a diagram of components of a second exemplary switch plane according to an implementation consistent with the principles of the invention.

FIGS. 3 and 4 illustrate exemplary components of a single physical switch plane, implemented with virtual switch planes, of network device 200 consistent with the principles of the invention. FIG. 3 illustrates one exemplary embodiment in which queues associated with the different virtual switch planes are segregated. FIG. 4 illustrates another exemplary embodiment in which the queues are shared by the different virtual switch planes implemented in the single physical switch plane.

As shown in FIG. 3, a single physical switch plane of a switch fabric 210 may include 12 switch ICs 320-1-320-12 (collectively, 320) arranged in a three stage (stage 1 305, stage 2 310, stage 3 315) Clos configuration. Input interfaces 205 may include multiple interface (I/F) cards 325-1-325-4 (collectively, 325) that interconnect with stage 1 305 switch ICs 320. Output interfaces 215 may include multiple I/F cards 325-1-325-4 that interconnect with stage 3 315 switch ICs 320. Each line shown interconnected between one of I/F cards 325 and a switch IC 320 may represent a connection, such as a copper or fiber connection, to ports on the switch ICs 320. FIG. 3 illustrates two virtual planes A and B implemented in physical switch fabric 210. Each of I/F cards 325 may interconnect to a switch IC 320 via a number of connections (two shown for illustrative purposes). Some of the connections between I/F cards 325 and switch ICs 320 may be part of virtual switch plane A and others of the connections may be part of virtual switch plane B. In each stage 1 305 switch IC 320, for example, data units received via the first connection may only be "sprayed" to the first two of stage 2 310 switch ICs 320 (designated "A"). Data units received via the second connection may only be "sprayed" to the second two of stage 2 310 switch ICs 320 (designated "B"). At stage 2 310, two of switch ICs 320 (designated "A") carry only data units for virtual switch plane A and the other two of switch ICs 320 (designated "B") carry only traffic for virtual switch plane B.

Virtual switch planes A and B use distinct queues throughout switch fabric 210. At stage 1 305 and stage 3 315, each virtual switch plane uses a separate subset of the input and output ports of each switch IC. At state 2 310, virtual switch plane A and B use separate switch ICs 320, and virtual switch plane A and B further use distinct queues such that virtual switch plane A data units travel only through the first two input ports of each stage 3 315 switch IC 320 and virtual switch plane B data units travel only through the second two input ports of each stage 3 315 switch IC 320. Implementing virtual switch planes in physical switch fabric 210 may, thus, require that an equal fraction of stage 1 305 switch IC 320 input ports be used for each virtual switch plane. In the exemplary embodiment of FIG. 3, in which two virtual switch planes (A and B) are implemented in switch fabric 210, half of the input ports of each stage 1 305 switch IC 320 may be used for virtual switch plane A and the other half for virtual switch plane B. The ports of stage 3 315 switch ICs 320 may have similar constraints. The principles involved in dividing switch fabric 100 into two virtual switch planes, as described above, may be generalized to divide switch fabric 100 into more than two switch planes.

FIG. 4 illustrates another exemplary embodiment consistent with the principles of the invention in which data units handled by both virtual switch plane A and virtual switch plane B share the same queues in stage 2 310 switch ICs 320 (designated "A+B"). In this exemplary embodiment, stage 1 305 switch ICs 320 spray data units from all input ports to all output ports. Stage 2 310 switch ICs 320 direct data units to the correct stage 3 315 switch IC 320 based on an interface card destination address and virtual switch plane number associated with each data unit.

Exemplary Switch IC

Figure 5:
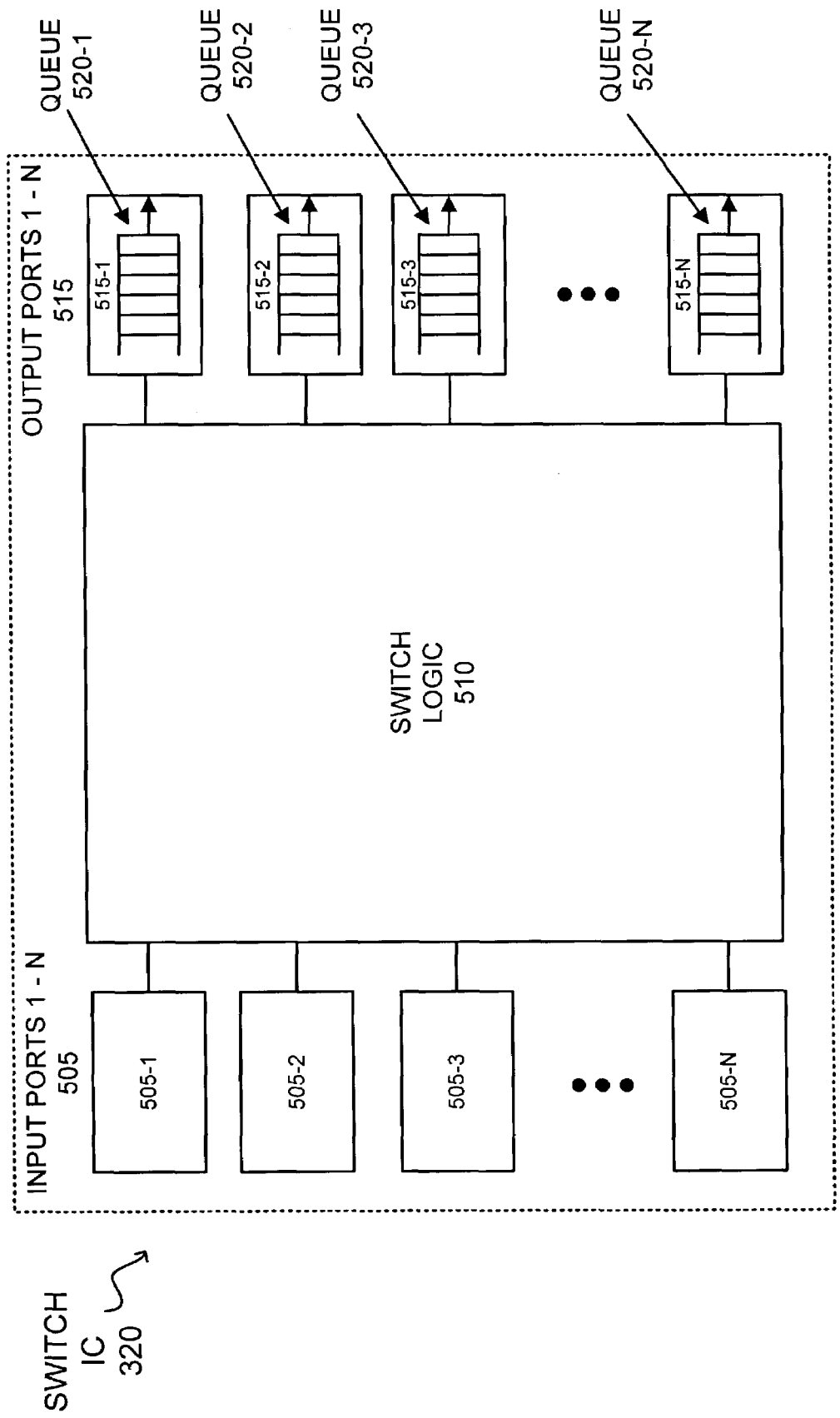
FIG. 5 is a diagram of an exemplary switch IC consistent with the principles of the invention.

FIG. 5 illustrates an exemplary one of switch ICs 320 consistent with the principles of the invention. The switch IC 320 may include N inputs ports 505-1-505-N (collectively, 505) and N output ports 515-1-515-N (collectively 515) interconnected with switch logic 510. Switch logic 510 may include, for example, crossbar switch logic. Switch logic 510 forwards each data unit received from an input port 505 to an appropriate output port 515 based on the data unit's destination I/F card 325. Each output port 515 may further include one or more queues 520 for buffering data units received from switch logic 510 before sending the data units out of switch IC 320.

Exemplary Next Port and Jump Tables

Figure 6:
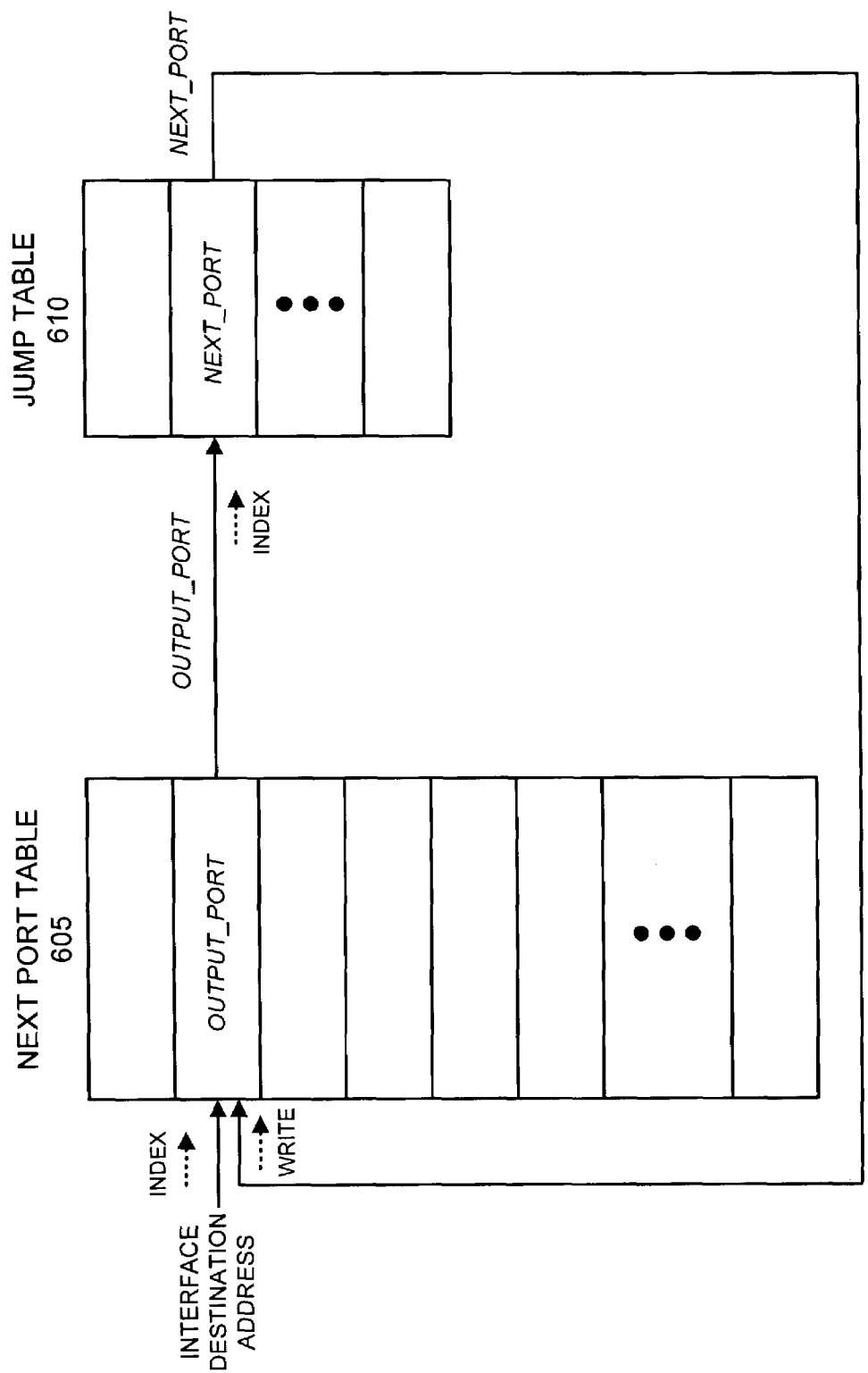
FIG. 6 is a diagram of exemplary next port and jump tables stored in the switch IC of FIG. 5 consistent with the principles of the invention.

FIG. 6 illustrates an exemplary next port table 605 and jump table 610 consistent with the principles of the invention. A different next port table 605 and jump table 610 may be associated with each input port 505 of stage 1 305 switch ICs 320. Next port table 605 may map an interface destination address to an output port address of a stage 1 305 switch IC 320. Jump table 610 may map the output port address from next port table 605 to a next port value (NEXT_PORT) that may overwrite the original value in next port table 605. Changing the value in next port table 605 as each interface destination address is mapped allows a sequence of data units, with the same interface destination address, to be load balanced (or "sprayed") over a set of output ports. The entries in jump table 610 determine the sequence of output ports to use for spraying.

In a switch fabric 210 with two virtual planes, tables 605 and 610 for stage 1 305 input ports 505, associated with virtual plane A, may be programmed to spray data units only to stage 1 305 output ports 515 for virtual plane A. This may be accomplished by storing the value ((i+1) mod p/2) in jump table 610 entry i, where p is the number of ports. Also, the initial values in next port table 605 should be less than p/2. For virtual plane B, the corresponding input ports should have jump table 610 entries set to (((i+1) mod p/2)+p/2) and the initial next port table 605 values may be greater than or equal to p/2. The pointers in jump table 610, thus, form two disjoint circular lists, and each next port table 605 value points to a current position in one of the disjoint lists (i.e., the one corresponding to the virtual plane on which the data units were sent). A sequence of data units sent to a given destination may, therefore, cycle through only half of the output ports corresponding to the virtual plane on which the data units were sent. This algorithm may be generalized for any number of virtual planes.

As shown in FIG. 6, next port table 605 may map an interface destination address associated with a data unit to an output port 515 of stage 1 305 switch IC 320 that receives the data unit from an input interface 205. The interface destination address may correspond to a destination I/F card 325 of output interfaces 215 and may be included in a header of a data unit. An interface destination address received at next port table 605 may be used to index the table to retrieve an output port address (OUTPUT_PORT) of stage 1 305 switch IC 320 through which the data unit should be forwarded. The entire address, part of the address, or the result of an algorithm performed on the address, such as a hash, may be used as the index value. The output port address (OUTPUT_PORT), corresponding to an output port 515, may be passed to jump table 610. The output port address (OUTPUT_PORT) may then index jump table 610 to retrieve a port address (NEXT_PORT) that may replace the previously retrieved entry of next port table 605. A sequence of port addresses (NEXT_PORT) in jump table 610 determines the order in which data units are "sprayed" out the different output ports 515 of stage 1 305 switch IC 320.

Figure 7B:
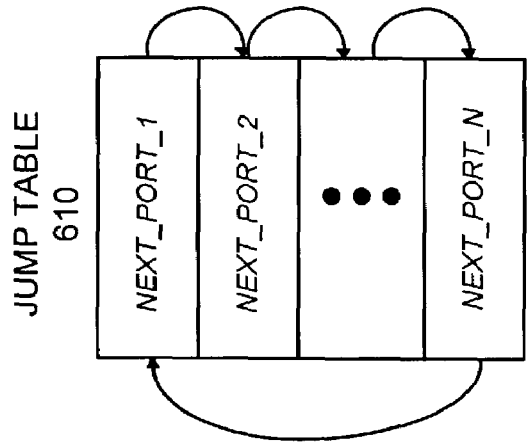
FIGS. 7A and 7B are diagrams of exemplary jump tables consistent with the principles of the invention.
Figure 7A:
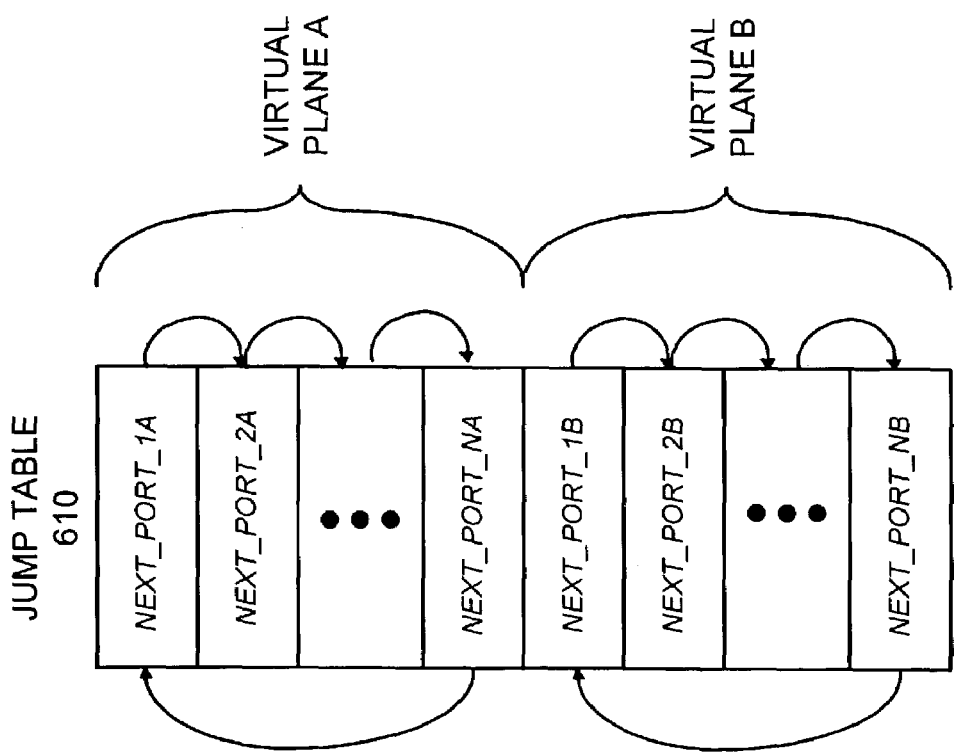

FIGS. 7A and 7B further illustrate exemplary embodiments of jump table 610 consistent with the principles of the invention. The exemplary jump table 610 of FIG. 7A may be used in the exemplary switch fabric 210 of FIG. 3. The exemplary jump table 610 of FIG. 7B may be used in the exemplary switch fabric 210 of FIG. 4.

In the exemplary jump table 610 of FIG. 7A, a group of port addresses may be associated with each virtual switch plane implemented in physical switch fabric 210. For example, FIG. 7A illustrates port addresses NEXT_PORT_1A through NEXT_PORT_NA associated with virtual plane A. Data units processed by virtual switch plane A may, thus, be "sprayed" out output ports 515 of stage 1 305 switch IC 320 according to the sequence of entries corresponding to each virtual switch plane.

In the exemplary jump table 610 of FIG. 7B, the port addresses may not be associated with any virtual switch plane. Each data unit, therefore, may be "sprayed" out an output port 515 of a stage 1 305 switch IC 320 according to the sequence of entries of jump table 610 regardless of which virtual switch plane is handling the data unit.

Exemplary Destination Fabric Address Translation Table

Figure 8:
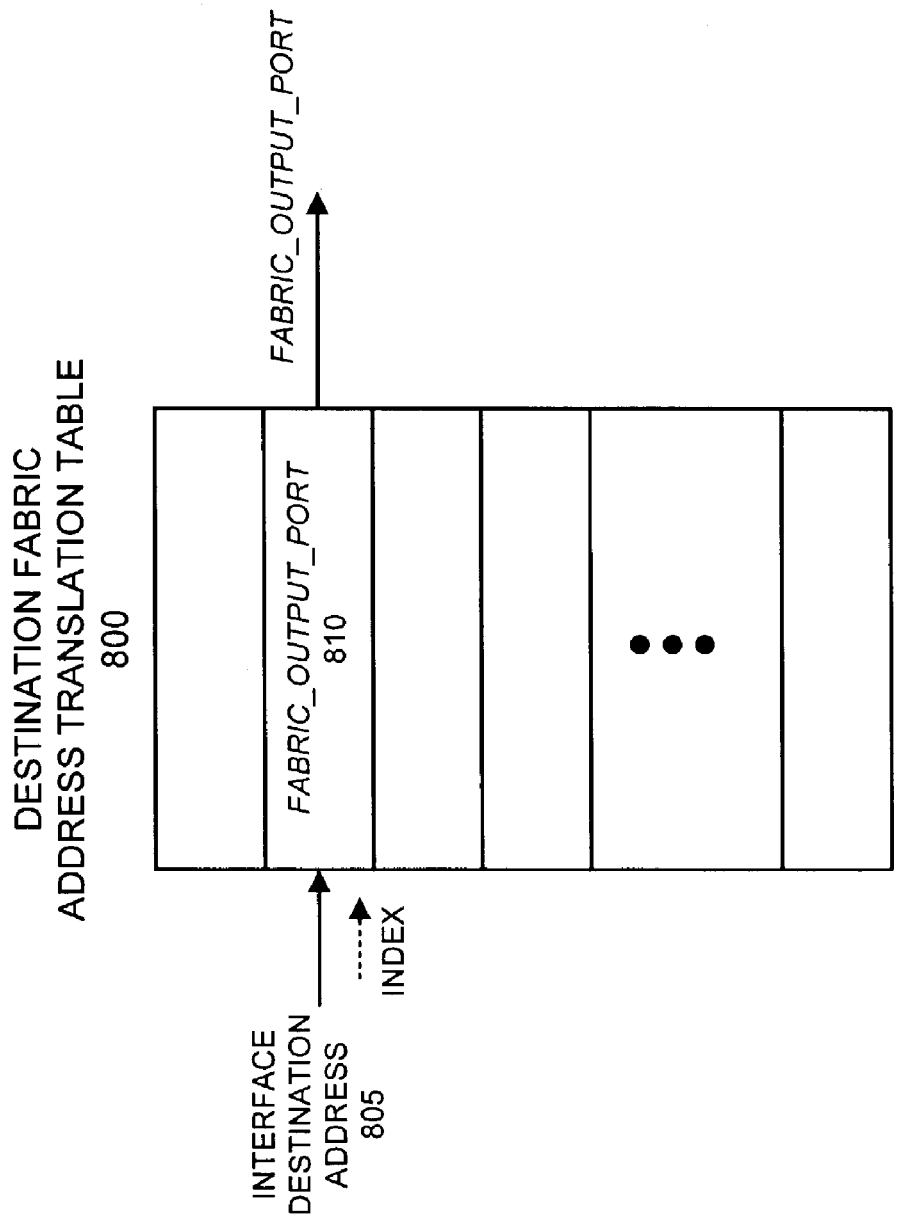
FIG. 8 is a diagram of an exemplary destination fabric output port table consistent with the principles of the invention.

FIG. 8 illustrates an exemplary destination fabric address translation table 800 consistent with the principles of the invention. A different table 800 may be associated with each input port 505 of stage 1 305 switch ICs 320. Destination fabric address translation table 800 may map interface destination addresses 805 associated with each data unit to switch fabric output ports 810. Each retrieved fabric output port 810 may correspond to an output port 515 of stage 3 315 switch ICs 320. Each interface destination address 805 associated with a data unit may index table 800 to retrieve a fabric output port address 810 (FABRIC_OUTPUT_PORT) associated with an output port 515 of a stage 3 315 switch IC 320.

In a fabric without virtual switch planes each interface card connects to a single port of each fabric plane. Therefore, each interface card has one destination address. When an interface card sends a packet into the fabric the interface card also transmits the fabric port address of the data unit's destination. In a fabric with virtual switch planes each interface card connects to more than one port of each fabric plane. In order to avoid changes to the interface card configuration depending on the presence or number of virtual planes, ideally the interface card should still have only one "logical" fabric address that is used by the other interface cards to identify a particular card. However, within a switch plane each card has multiple "physical" fabric addresses, one per virtual plane.

The fabric address translation table 800 re-maps the logical fabric destination address provided by the source interface card into a physical fabric address specific to a virtual plane. Because there is a different fabric address translation table 800 associated with each input port, and each input port is associated with a single virtual plane, multiple virtual planes can be supported by loading different values into each fabric address translation table.

Exemplary Source Fabric Address Translation Table

Figure 9:
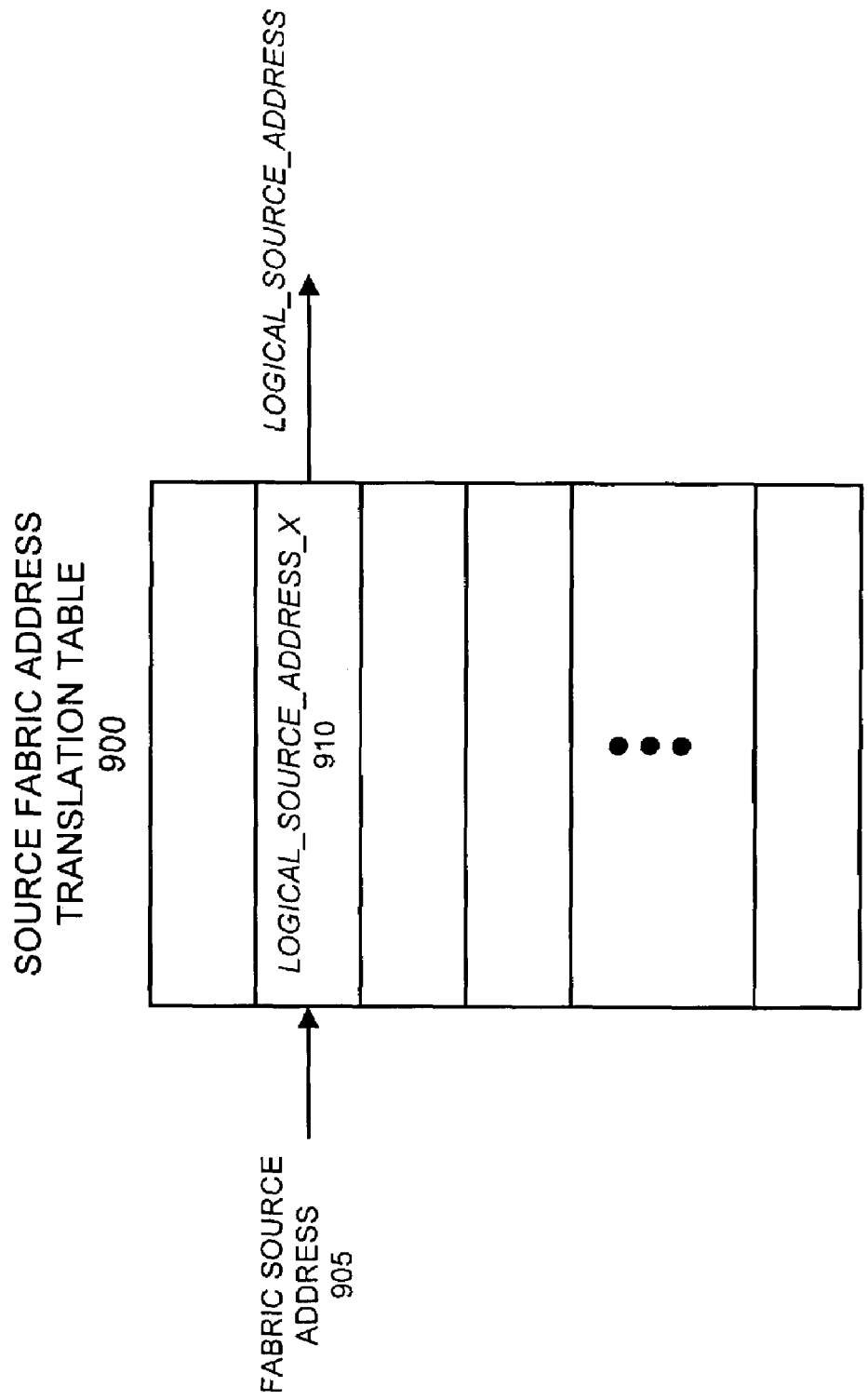
FIG. 9 is a diagram of an exemplary source interface table consistent with the principles of the invention.

FIG. 9 illustrates an exemplary source fabric address translation table 900 consistent with the principles of the invention. A different source fabric address translation table 900 may be associated with each input port 505 of stage 3 315 switch ICs 320. Source fabric address translation table 900 may map fabric source addresses 905 to a logical source address 910 associated with each virtual plane implemented in physical switch fabric 210. Fabric source address 905 may be automatically constructed by recording the sequence of switch IC 320 ports along the path traveled by a data unit through the stages of switch fabric 210. When the data unit arrives at a stage 3 315 switch IC 320 input port 505, table 900 may be used to re-map the fabric source address 905 to a logical source address used by the I/F cards 325 of output interfaces 215. Source fabric address translation table 900 may map physical source addresses used internally in the fabric to logical source addresses used externally by the interface cards. In a system with virtual planes, multiple physical addresses map to a single logical address so multiple entries in the table will have the same logical address.

Exemplary Data Unit Handling Process

Figure 10:
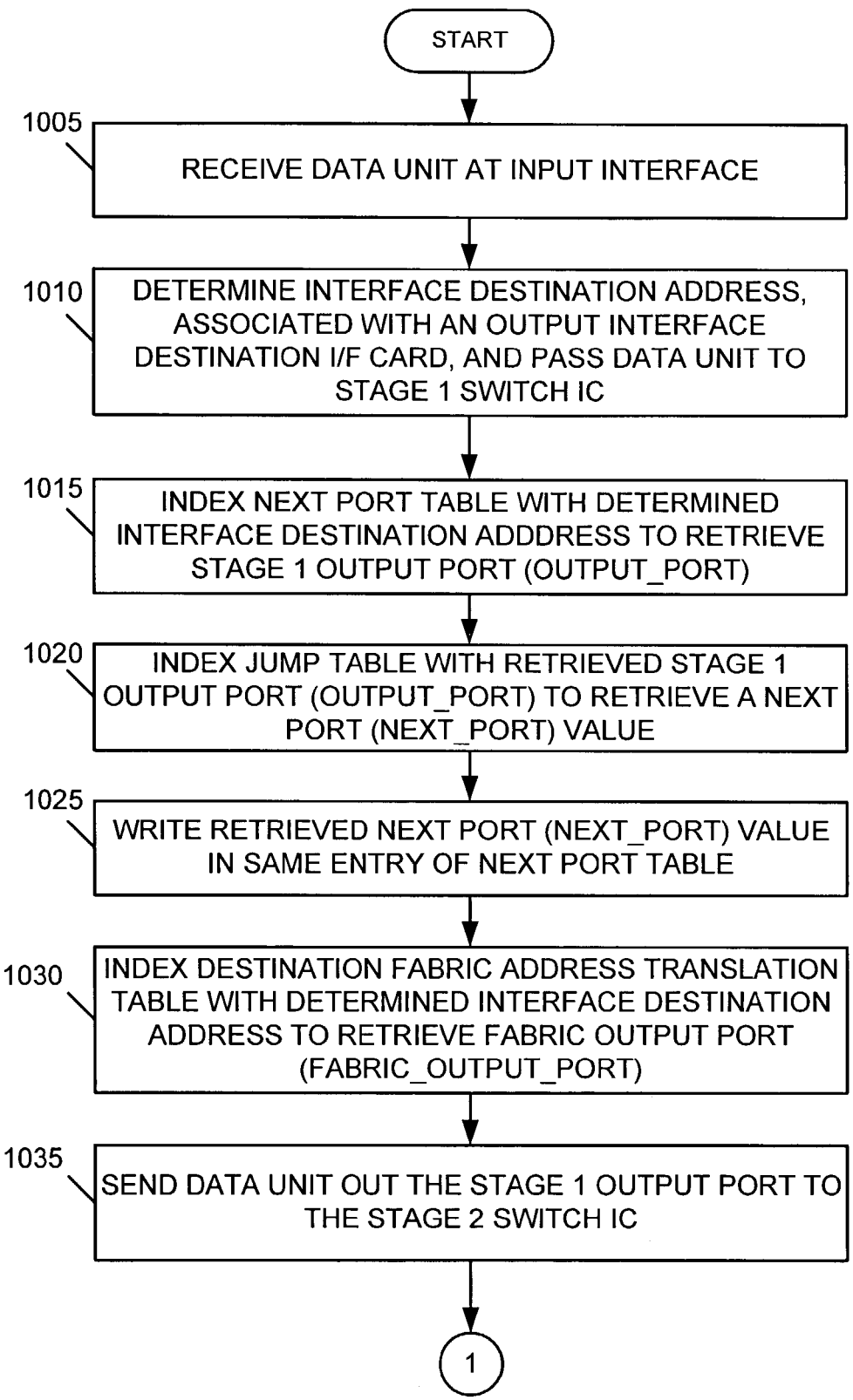
FIGS. 10-11 are flowcharts of an exemplary data unit handling process according to an implementation consistent with principles of the invention.
Figure 11:
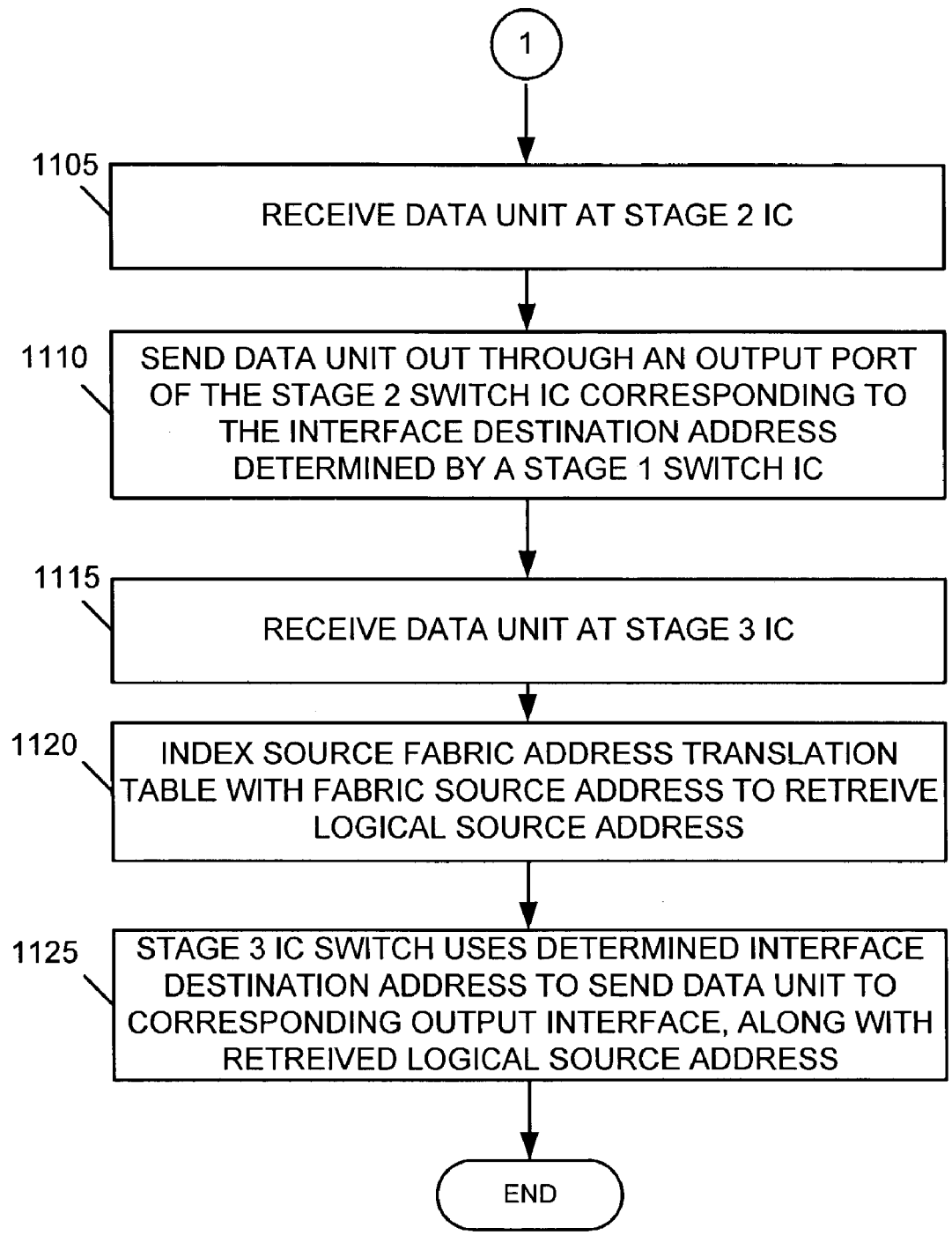

FIGS. 10-11 are flowcharts of an exemplary process for handling data units received at network device 200 in accordance with implementations consistent with the principles of the invention. The exemplary process may begin with the receipt of a data unit at an I/F card 325 of input interfaces 205 [act 1005]. The receiving I/F card 325 may then determine an interface destination address, associated with a destination I/F card 325 of output interfaces 215, and pass the received data unit to a stage 1 305 switch IC 320 [act 1010]. Stage 1 switch IC 320 may index next port table 605, with the determined interface destination address, to retrieve a stage 1 305 switch IC 320 output port (OUTPUT_PORT) [act 1015]. Stage 1 switch IC 320 may further index jump table 610 with the retrieved stage 1 305 switch IC 320 output port (OUTPUT_PORT) to retrieve a next port value (NEXT_PORT) [act 1020]. Stage 1 switch IC 320 may write the retrieved next port value (NEXT_PORT) into the same entry of next port table 605 [act 1025].

Stage 1 switch IC 320 may then index destination fabric output port table 800 with the determined destination interface destination address to retrieve a fabric output port (FABRIC_OUTPUT_PORT) [act 1030]. Stage 1 switch IC 320 may then send the data unit out an output port 515 corresponding to the retrieved output port (OUTPUT_PORT) value [act 1035]. A stage 2 310 switch IC 320 may then receive the data unit [act 1105]. The stage 2 310 switch IC 320 may send the received data unit out through an output port 515 corresponding to an interface card 325 interface destination address determined by a stage 1 switch IC 320 (FABRIC_OUTPUT_PORT) [act 1110]. A stage 3 315 switch IC 320 on the path through switch fabric 210 may receive the data unit [act 1115]. The stage 3 315 switch IC 320 may index source fabric address translation table 900 with a fabric source address 905 to retrieve a logical source address [act 1120]. Stage 3 315 switch IC 320 may then use the interface destination address determined by a stage 1 switch IC (FABRIC_OUTPUT_PORT) to send the data unit to a corresponding I/F card 325 of output interfaces 215 [act 1125]. The logical source address retrieved from table 900 may be transmitted to the I/F card 325 along with the data unit.

CONCLUSION

Consistent with the principles of the present invention, multiple virtual switch planes may be implemented in a physical switch plane of a network device such that the network device switch fabric can support systems with fewer interface cards than the number of switch ports on the switch fabric. A switch fabric with P ports may, for example, when implemented with S virtual switch planes, connect with P/S interface cards by connecting each interface card to the switch fabric S times. Address re-mapping tables may, consistent with the principles of the invention, be used within switch ICs of the switch fabric to direct incoming data units through appropriate virtual switch planes to reach destination output interfaces. The use of virtual switch planes within the switch fabric can be transparent to the interface cards, localizing changes to the switch fabric itself rather than requiring the interfaces cards to be configured differently depending on the switch configuration.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, though the switch plane described above employed a three-stage Clos network, smaller switch plane implementations that have, for example, a single crossbar chip per physical fabric plane, may be used.

In such an implementation, source fabric address translation table 900 and destination fabric address translation table 800 may be implemented in the same IC.

While series of acts have been described in FIGS. 10-11, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method of implementing multiple virtual switch planes in a single physical switch plane, the single physical switch plane comprising a switch fabric and a plurality of queues arranged in at least a three-stage configuration, the method comprising:
    segmenting the single physical switch plane into the multiple virtual switch planes;
    segregating the queues of each stage into groups such that each group of the queues is associated with a different one of the multiple virtual switch planes, wherein a set of input ports and output ports are associated with each of the queues;
    receiving data units at the single physical switch plane;
    assigning each of the data units to one of the multiple virtual switch planes; and
    conveying, through different ones of the virtual switch planes, the assigned units from a first queue in a first stage and associated with one of the groups of the queues to a second queue in a next stage and associated with the one group using a subset of the set of input ports and the output ports associated with the first and second queues.

2. A network device, comprising:
    a physical switch plane comprising a switch fabric queues arranged in at least a three-stage configuration and having a set of input ports and output ports, the physical switch plane being segmented into a plurality of virtual switch planes, and the queues being segregated into groups such that each group is associated with a different virtual switch plane of the plurality of virtual switch planes and handles only data units assigned to the different virtual switch plane, wherein the assigned data units are sent from a first queue in a first one of the stages of a first group of the queues to a second queue of an intermediary stage of the first group, and the data units are sent from the second queue to a third queue of a next stage of the first group using a subset of the set of input ports and the output ports which is associated with the first group of the queues; and
    interface cards coupled to the physical switch plane, the interface cards configured to receive data units and transmit the data units through the physical switch plane.

3. The device of claim 2, wherein one of the interface cards is configured to send the assigned data units to the first queue.

4. The device of claim 3, wherein the data units assigned to one of the different virtual switch planes is segregated from other ones of the data units assigned to another one of the different virtual switch planes that is associated with a second group of the queues using another subset of the output ports of at least one of the first queue, the second queue, or the third queue, the other subset being associated with the second group of the queues.

5. The device of claim 3, wherein the data units assigned to one of the different virtual switch planes is mixed with other ones of the data units assigned to another one of the different virtual switch planes that is associated with a second group of the queues.

6. The device of claim 2, wherein the three-stage configuration comprises a Clos configuration.

7. The device of claim 2, wherein the queues comprise switch integrated circuits that include crossbar switches.

8. The device of claim 7, wherein a first group number of the interface cards interconnect only with select ones of the switch integrated circuits.

9. The device of claim 8, wherein other ones of the interface cards interconnect only with other select ones of the switch integrated circuits.

10. The method of claim 1, wherein the single physical switch plane comprises switch integrated circuits.

* * * * *

UNITED STATES PATENT AND TRADEMARK OFFICE
CERTIFICATE OF CORRECTION

PATENT NO. : 7,397,794 B1
APPLICATION NO. : 10/300639
DATED : July 8, 2008
INVENTOR(S) : Philippe Lacroute et al.

It is certified that error appears in the above-identified patent and that said Letters Patent is hereby corrected as shown below:

Col. 8, line 39, after "fabric" insert --and--.

Col. 10, line 1, delete "first group".

Signed and Sealed this

Twenty-sixth Day of August, 2008

JON W. DUDAS
*Director of the United States Patent and Trademark Office*